(12) United States Patent
Hsu et al.

(10) Patent No.: US 11,929,000 B2
(45) Date of Patent: Mar. 12, 2024

(54) DISPLAY SYSTEM AND DISPLAY ARRAY

(71) Applicant: AUO Display Plus Corporation, Hsinchu (TW)

(72) Inventors: Sheng-Kai Hsu, Hsinchu (TW); Hung-Min Shih, Hsinchu (TW); Yung-Jen Chen, Hsinchu (TW)

(73) Assignee: AUO Display Plus Corporation, Hsinchu (TW)

( * ) Notice: Subject to any disclaimer, the term of this patent is extended or adjusted under 35 U.S.C. 154(b) by 0 days.

(21) Appl. No.: 18/097,507

(22) Filed: Jan. 17, 2023

(65) Prior Publication Data

US 2023/0154370 A1    May 18, 2023

(30) Foreign Application Priority Data

Dec. 9, 2022 (TW) .................. 111147415

(51) Int. Cl.
*G09G 3/20* (2006.01)

(52) U.S. Cl.
CPC ......... *G09G 3/20* (2013.01); *G09G 2300/026* (2013.01); *G09G 2360/04* (2013.01)

(58) Field of Classification Search
CPC ..... G09G 3/20; G09G 3/2096; G09G 2360/04
See application file for complete search history.

(56) References Cited

U.S. PATENT DOCUMENTS

| 2006/0208993 A1* | 9/2006 | Jung | G06F 1/1647 345/98 |
| 2021/0365230 A1* | 11/2021 | Sul | G06F 3/1431 |
| 2022/0343831 A1* | 10/2022 | Li | G09G 3/3666 |

FOREIGN PATENT DOCUMENTS

| CN | 107872720 A | 4/2018 |
| CN | 113205779 A | 8/2021 |

\* cited by examiner

*Primary Examiner* — Gerald Johnson

(57) ABSTRACT

The display system comprising a main control module and a display module is provided. The main control module comprises a display driving circuit and a timing control circuit. The display driving circuit is used to output a display driving signal. The timing control circuit is coupled to the display driving circuit to receive the display driving signal, and convert the display driving signal into a digital signal. The display module comprises a first display panel to an N-th display panel, coupled to the timing control circuit and receiving the digital signal, so as to display corresponding multimedia content according to the digital signal, wherein N is a positive integer greater than 1, and the main control module is independently coupled to the display module.

2 Claims, 4 Drawing Sheets

100

DISPLAY SYSTEM AND DISPLAY ARRAY

FIELD OF THE INVENTION

The invention relates to a display system, and more particularly, to a framework in which a main control module shared by multiple displays.

BACKGROUND OF THE INVENTION

Recently, digital display boards have been widely applied to bus stops and MRT platforms to provide information of incoming vehicles for passengers. However, at present, all the products on the market is in the design of including both an AD Board and a T-CON Board in one digital electronic billboard, resulting in the huge volume of the digital electronic billboard. Specially, due to including many circuit solutions, the side thickness of the digital electronic billboard is difficult to be further reduced. In this way, the digital electronic billboard not only has an unattractive appearance, but also takes up a lot of space.

In addition, at present, large sized digital electronic billboards (i.e., 200-inches TV wall) are usually constructed by several small panels, which are used to display audio-visual content (i.e., advertising information). When each panel needs its own panel driving board and timing control board, the thickness and volume of the whole TV wall will be extraordinarily undesirable.

To sum up, there is a need for a thorough solution for the digital electronic display board and an associated master control system to solve the aforementioned problems, especially to reduce the thickness of digital electronic display board, so as to achieve the compactness.

SUMMARY OF THE INVENTION

One objective of the present invention is to provide a display system and an associated display array to solve the aforementioned problems.

An embodiment of the invention provides a display system that comprises a main control module and a display module. The main control module comprises a display driving circuit and a timing control circuit. The display driving circuit is arranged to output a display driving signal. The timing control circuit is coupled to the display driving circuit, and arranged to receive the display driving signal and convert the display driving signal into a digital signal. The display module comprises a first display panel to an N-th display panel coupled to the timing control circuit and receiving the digital signal to display corresponding multimedia content according to the digital signal, where n is a positive integer greater than 1, and the main control module is independently coupled to the display module.

Another embodiment of the present invention provides a display array comprising a first display panel to an N-th display panel, the first display panel to the N-th display panel being coupled to a same timing control circuit to receive a digital signal from said same timing control circuit and display corresponding multimedia contents according to the digital signal, wherein n is a positive integer greater than 1, and said same timing control circuit is independently coupled to the display array.

To sum up, according to the design of the present invention, the display driving circuit and the timing control circuit are arranged to be external, and a plurality of displays (e.g., digital electronic billboards) share the same display driving circuit and the same timing control circuit, so that the volume of the internal circuit of the display can be reduced, thus meeting the demand of thinning the display. In addition, because the plurality of displays are only equipped with a single display driving circuit and a single timing control circuit, the overall cost is greatly reduced.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

Figure 1A:
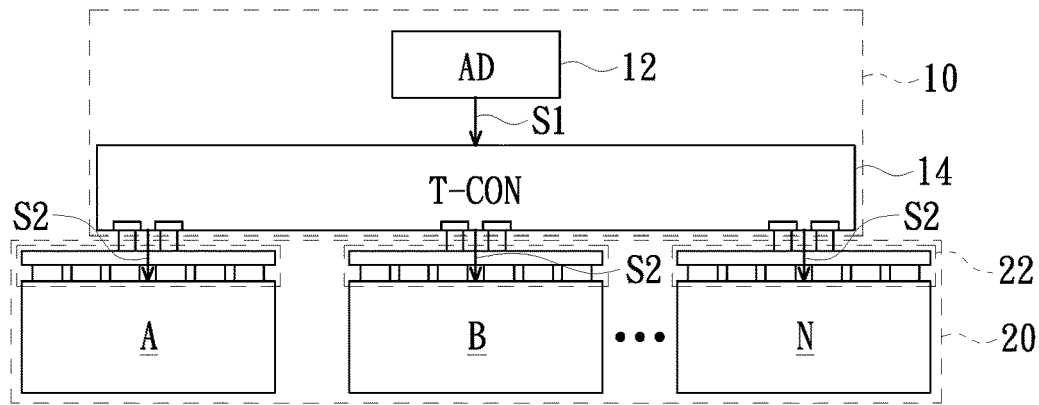
FIG. 1A is a schematic diagram of a display system according to an embodiment of the present invention.

The present disclosure is particularly described by following examples which are only for illustration. For those who are familiar with the technologies, various modifications and embellishments can be made without departing from the spirit and scope of the present disclosure, and thus the scope of the present disclosure shall be subject to the content of the attached claims. In the entire specification and claims, unless clearly specified, terms such as "a/an" and "the" can be used to describe "one or at least one" assembly or component. In addition, unless the plural use is obviously excluded in the context, singular terms may also be used to present plural assemblies or components. Unless otherwise specified, the terms used in the entire specification and claims generally have the common meaning as those used in this field. Certain terms used to describe the disclosure will be discussed below or elsewhere in this specification, so as to provide additional guidance for practitioners. The examples throughout the entire specification as well as the terms discussed herein are only for illustrative purposes, and are not meant to limit the scope and meanings of the disclosure or any illustrative term. Similarly, the present disclosure is not limited to the embodiments provided in this specification.

The terms "substantially", "around", "about" or "approximately" used herein may generally mean that the error of a given value or range is within 20%, preferably within 10%. In addition, the quantity provided herein can be approximate, which means that unless otherwise stated, it can be expressed by the terms "about", "nearly", etc. When the quantity, concentration, or other values or parameters have a specified range, a preferred range, or upper and lower boundaries listed in the table, they shall be regarded as a particular disclosure of all possible combinations of ranges constructed by those upper and lower limits or ideal values, no matter such kind of ranges have been disclosed or not. For example, if the length of a disclosed range is X cm to Y cm, it should be regarded as that the length is H cm, and H can be any real number between x and y.

In addition, the term "electrical coupling" or "electrical connection" may include direct and indirect means of electrical connection. For example, if it is described that the first device is electrically coupled to the second device, it means that the first device can be directly connected to the second device, or indirectly connected to the second device through other devices or means of connection. In addition, if the transmission and provision of electric signals are described, those who are familiar with the art should understand that the transmission of electric signals may be accompanied by attenuation or other non-ideal changes. However, unless the source and receiver of the transmission of electric signals are specifically stated, they should be regarded as the same signal in essence. For example, if the electrical signal S is transmitted (or provided) from the terminal A of the electronic circuit to the terminal B of the electronic circuit, which may cause voltage drop across the source and drain terminals of the transistor switch and/or possible stray capacitance, but the purpose of this design is to achieve some specific technical effects without deliberately using attenuation or other non-ideal changes during transmission (or provision), the electrical signals S at the terminal A and the terminal B of the electronic circuit should be substantially regarded as the same signal.

The terms "comprising", "having", "comprising" and "involving" used herein are open-ended terms, which can mean "comprising but not limited to". In addition, the scope of any embodiment or claim of the present invention does not necessarily achieve all the purposes or advantages or features disclosed in the present invention. In addition, the abstract and title are only used to assist the search of patent documents, and are not used to limit the scope of claims of the present invention.

Please refer to FIG. 1A, which is a schematic diagram of a display system 100 according to an embodiment of the present invention. As shown in FIG. 1A, the display system 100 comprises a main control module 10 and a display module 20, wherein the main control module 10 is externally coupled to the display module 20, that is, the main control module 10 and the display module 20 are arranged in different devices (not shown) respectively. The main control module 10 comprises a display driving circuit 12 (marked as "AD" for better understanding) and a timing control circuit 14 (marked as "T-CON"), and the display driving circuit 12 is used to output a display driving signal S1. The timing control circuit 14 is coupled to the display driving circuit 12 to receive the display driving signal S1 from the display driving circuit 12, and convert the display driving signal S1 into a digital signal S2.

The display module 20 comprises a display array composed of a plurality of display panels, such as the first display panel A to the N-th display panel N (with N being a positive integer greater than 1) which are respectively coupled to the timing control circuit 14 and receive the digital signal S2 from the timing control circuit 14 to display corresponding multimedia content according to the digital signal S2, wherein the main control module 10 is independently coupled to the display module 20. A conversion unit 22 may be coupled between the first display panel A to the N-th display panel N and the timing control circuit 14. The conversion unit 22 may be a circuit board assembly comprising a hard printed circuit board (PCB) and/or a flexible printed circuit board (FPC), and is used to convert the digital signal S2 into signal types and resolutions compatible with the first display panel A to the N-th display panel N. It should be noted that the present invention does not limit that a plurality of display panels constituting the display array must be arranged in the same device. For example, these display panels may constitute a large digital electronic billboard or be arranged in different digital electronic billboards respectively.

Figure 1B:
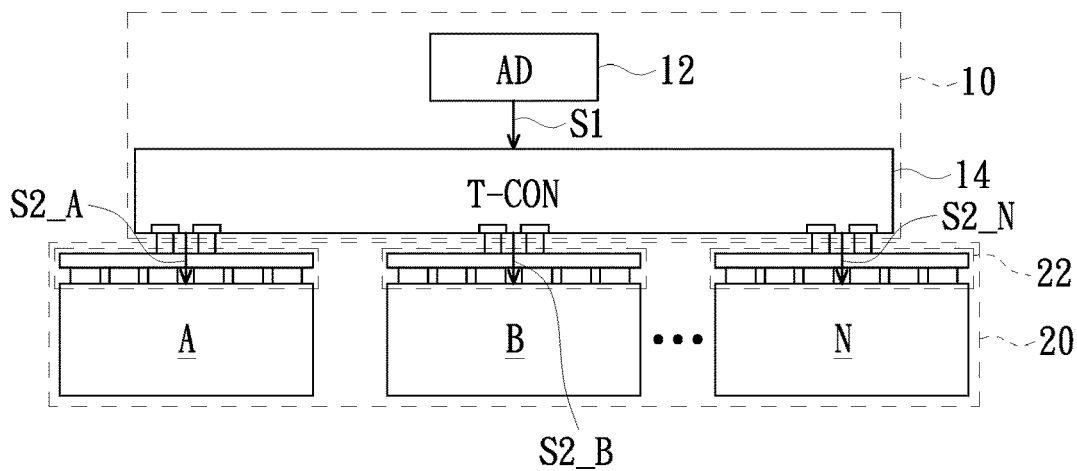
FIG. 1B is a schematic diagram of an alternative solution of the embodiment shown in FIG. 1A.

In the embodiment shown in FIG. 1A, the first display panel A to the N-th display panel N are coupled to the timing control circuit 14 in parallel and receive the same digital signal S2, so that the first display panel A to the N-th display panel N may display the same multimedia content (e.g., images, sounds, etc.). However, in the display system 100' shown in FIG. 1B, the first display panel A to the N-th display panel N respectively receive the digital signals S2_A, S2_B, . . . , S2_N and display different multimedia contents accordingly. It should be noted that the display panels A to N may be arranged in individual electronic devices (i.e., a plurality of digital electronic billboards), or can be spliced into a large display screen (i.e., a large TV wall). In addition, the present invention does not limit the types of the first display panel A to the N-th display panel N, they can be flat panels or curved flexible panels. In addition, the first display panel A to the N-th display panel N can be backlit display panels or non-backlit display panels (e.g., panels that adopt the electronic paper technology). Moreover, some of the first display panel A to the N-th display panel N that form the display module 20 can be backlit display panels while the others can be non-backlit display panels.

As the related art solution assign each digital electronic display board with a timing control circuit and a display driving circuit, the compactness of the digital electronic display boards cannot be achieved. On the contrary, according to the present invention, the timing control circuit 14 and the display driving circuit 12 are externally coupled to the display module 20 (i.e., externally coupled to the digital electronic billboards), so that the digital electronic billboard may share the same external timing control circuit and the same display driving circuit, making the internal circuit volume greatly reduced, and the compactness of the digital electronic billboards can be achieved.

Figure 2A:
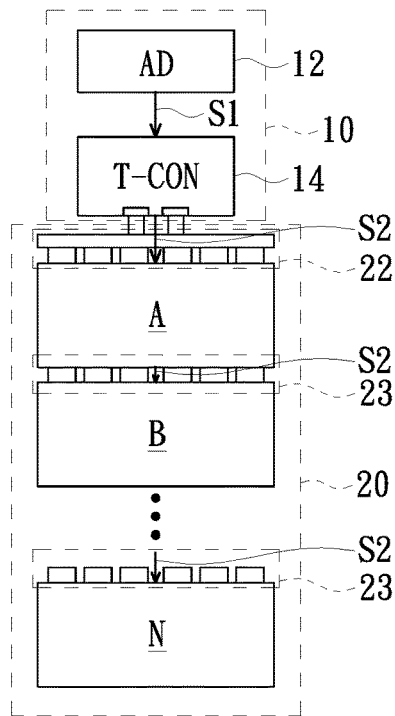
FIG. 2A is a schematic diagram of a display system according to another embodiment of the present invention.

Please refer to FIG. 2A, which is a schematic diagram of a display system 200 according to another embodiment of the present invention. As shown in FIG. 2A, the difference between the display system 200 and the display system 100 is that in the display system 200, the first display panel A to the N-th display panel N are coupled to the timing control circuit 14 in series, wherein the first side of the first display panel A is directly connected to the timing control circuit 14 and receives the digital signal S2 from the timing control circuit 14. Then, the first side of the second display panel B is directly connected to the second side of the first display panel A and receives the digital signal S2 from the first display panel A.

Figure 2B:
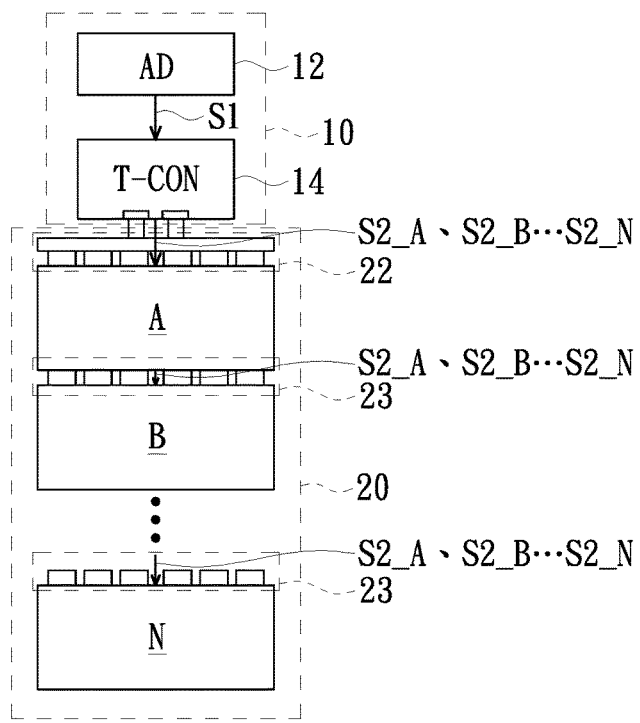
FIG. 2B is a schematic diagram of an alternative solution of the embodiment shown in FIG. 2A.

In the embodiment shown in FIG. 2A, the first display panel A to the N-th display panel N display the same multimedia content according to the same digital signal S2, and meanwhile, a large digital electronic billboard composed of the first display panel A to the N-th display panel N may display a plurality of sub-frames with the same content. In this manner, if the first display panel A to the N-th display panel N belong to different digital electronic billboards, these digital electronic billboards display the same content. In the display system 200' shown in FIG. 2B, the first display panel A to the N-th display panel N can execute corresponding parts of signals of the digital signal according to their respective timings, for example, they can extract the corresponding parts of signals from the digital signal respectively (i.e., the first display panel A may extracts the digital signal S2_A of the digital signals S2_A, S2_B, . . . , S2_N, and the second display panel B may extract the digital signal S2_A from the digital signals S2_A, S2_B, . . . , S2_N. In this manner, if the first display panel A to the N-th display panel N belong to different digital electronic billboards, these digital electronic billboards display different contents. In FIGS. 2A and 2B, the signal conversion unit 22 is directly connected with the timing control circuit 14 and the first display panel A, and the signal-bridging unit 23 is used for signal transmission between different display panels.

Figure 3A:
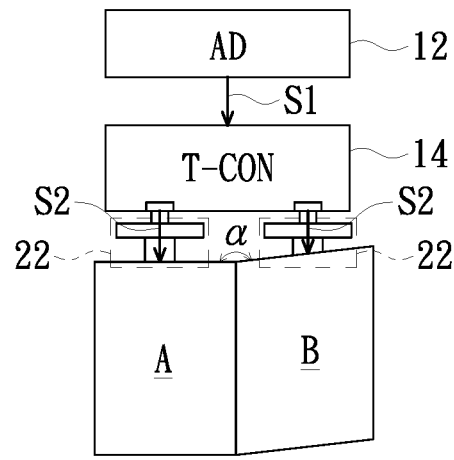
FIG. 3A is a modified example of the display system shown in FIG. 1A.

Please refer to FIG. 3A, which is a modified example of the display system 100 of FIG. 1A. As shown in FIG. 3A, the first display panel A to the N-th display panel N of the display system 300 are spliced in a particular angle. For example, there is an angle α between the first display panel A and the second display panel B, which is not 180 degrees. That is, the first display panel A and the second display panel B are not spliced in a horizontal manner. If this embodiment is applied to the corner of a building, a will be approximately 90 degrees.

Figure 3B:
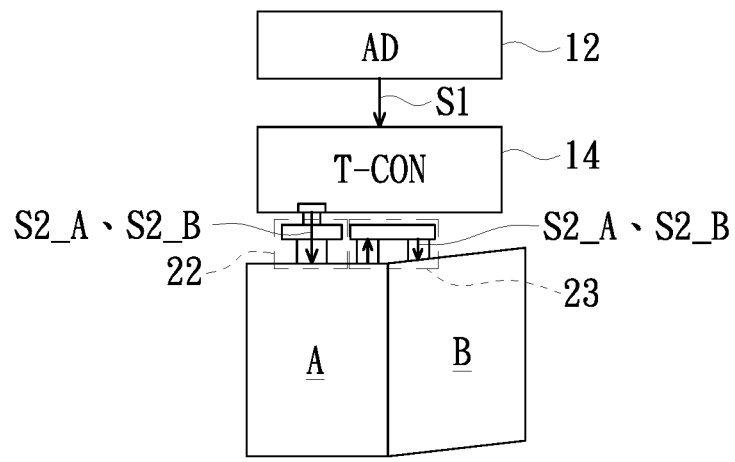
FIG. 3B is a schematic diagram of an alternative solution of the embodiment shown in FIG. 3A.

In the embodiment shown in FIG. 3A, the first display panel A and the second display panel B display the same multimedia content according to the same digital signal S2. Meanwhile, a large digital electronic billboard composed of the first display panel A and the second display panel B will display a plurality of sub-images each having the same content. In this manner, if the first display panel A and the second display panel B belong to different digital electronic billboards, these digital electronic billboards display the same content. In the display system 300' shown in FIG. 3B, the first display panel A and the second display panel B can execute corresponding signals of the digital signal according to their respective timings, for example, they can extract the corresponding parts from the digital signal (i.e., the first display panel A extracts S2_A from the digital signals S2_A and S2_B, and the second display panel B extracts S2_B from the digital signals S2_A and S2_B) to display different multimedia contents. If the first display panel A and the second display panel B belong to different digital electronic billboards, these digital electronic billboards display different contents. In FIG. 3B, the signal conversion unit 22 is directly connected with the timing control circuit 14 and the first display panel A, and the signal-bridging unit 23 is used for signal transmission between the first display panel A and the second display panel B.

Figure 4A:
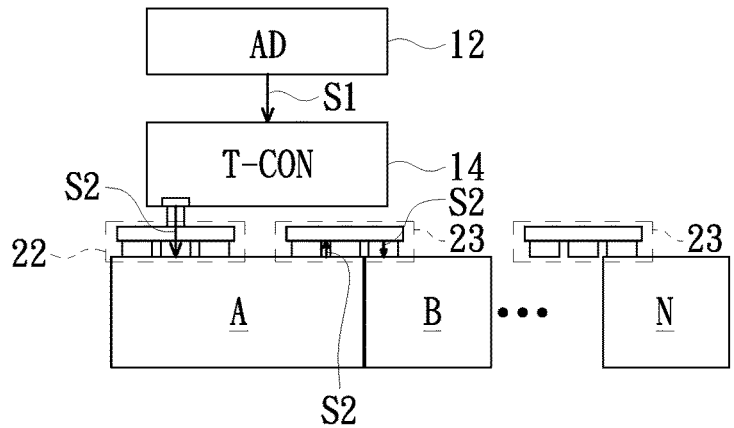
FIG. 4A is a modified example of the display system shown in FIG. 2A.

Please refer to FIG. 4A, which is a modified example of the display system 200 shown in FIG. 2A. As shown in FIG. 4A, the first display panel A to the N-th display panel N of the display system 400 are also coupled in series. However, compared with the stacked first display panel A to the N-th display panel N of the display system 200, the first display panel A to the N-th display panel N of the display system 400 is horizontally arranged, and each display panel shares the signal conversion unit 22 with the adjacent display panel. Specifically, the digital signal S2 from the timing control circuit 14 is received on the first end of the first display panel A (e.g., through the signal conversion unit 22). Then, the second end on the same side of the first display panel A is coupled to the first end one the same side of the second display panel B, and the second display panel B receives the digital signal S2 from the first display panel A (through the signal bridging unit 23), and so on.

Figure 4B:
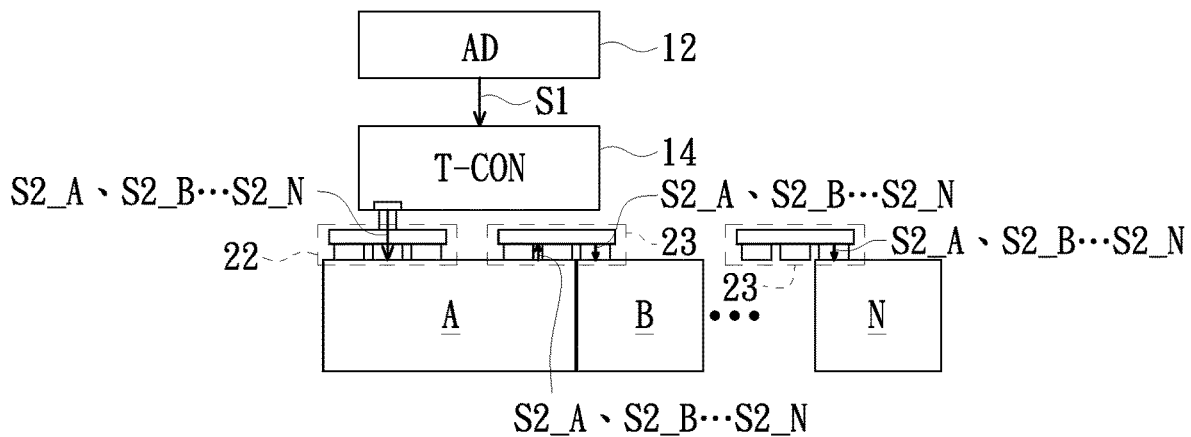
FIG. 4B is a schematic diagram of an alternative solution according to the embodiment shown in FIG. 4A.

In the embodiment shown in FIG. 4A, the first display panel A to the N-th display panel N display the same multimedia content according to the same digital signal S2, and meanwhile a large digital electronic billboard composed of the first display panel A to the N-th display panel N will display a plurality of sub-frames each having the same content. In this manner, if the first display panel A to the N-th display panel N belong to different digital electronic billboards, these digital electronic billboards display the same content. In the display system 400' shown in FIG. 4B, the first display panel A to the N-th display panel N can execute corresponding parts of signals in the digital signal according to their respective timings, for example, they can extract the corresponding parts from the digital signal (i.e., the first display panel A may extract S2_A from the digital signals S2_A, S2_B, . . . , S2_N, and the second display panel B may extract S2_A from the digital signals S2_A, S2_B, . . . , S2_N. In this manner, if the first display panel A to the N-th display panel N belong to different digital electronic billboards, these digital electronic billboards display different contents. In FIGS. 4A and 4B, the signal conversion unit 22 is directly connected with the timing control circuit 14 and the first display panel A, and the signal-bridging unit 23 is used for signal transmission between the display panels.

To sum up, according to the design of the present invention, the display driving circuit and the timing control circuit are arranged to be external, and a plurality of displays (e.g., digital electronic billboards) share the same display driving circuit and the same timing control circuit, so that the volume of the internal circuit of the display can be reduced, thus meeting the demand of thinning the display. In addition, because the plurality of displays are only equipped with a single display driving circuit and a single timing control circuit, the overall cost is greatly reduced.

Although the present invention has been disclosed aforementioned examples, these examples are not intended to limit the scope of the present invention. Those skilled in the art may readily make some changes and embellishments without departing from the spirit and scope of the present invention. Therefore, the scope of the present invention should base on what is defined in the appended claims.

What is claimed is:

1. A display system comprising:
   a main control module, comprising:
     a display driving circuit, arranged to output a display driving signal; and
     a timing control circuit coupled to the display driving circuit, the timing control circuit arranged to receive the display driving signal and convert the display driving signal into a digital signal; and
   a display module, comprising:
     a first display panel to an N-th display panel coupled to the timing control circuit and receiving the digital signal to display corresponding multimedia content according to the digital signal, where n is a positive integer greater than 1;
   wherein the main control module is independently coupled to the display module,
   wherein the first display panel to the N-th display panel are coupled in parallel to the timing control circuit, and receive the digital signal respectively;

wherein there are a plurality of signal conversion units coupled between the first display panel to the N-th display panel and the timing control circuit, and are arranged to convert the digital signal into signal types compatible with the first display panel to the N-th display panel.

2. A display array comprising a first display panel to an N-th display panel, the first display panel to the N-th display panel being coupled to a same timing control circuit to receive a digital signal from said same timing control circuit and display corresponding multimedia contents according to the digital signal, wherein n is a positive integer greater than 1, and said same timing control circuit is independently coupled to the display array, wherein the first display panel to the N-th display panel are coupled to said same timing control circuit in parallel, and receive the digital signal respectively, wherein a plurality of signal conversion units are coupled between the first display panel to the N-th display panel and said same timing control circuit respectively, in order to convert the digital signal into signal types compatible with the first display panel to the N-th display panel.

* * * * *